US012797911B2

(12) United States Patent
Putrams

(10) Patent No.: US 12,797,911 B2
(45) Date of Patent: Nov. 17, 2026

(54) WIND TURBINE ROBOTIC CLEANING AND PAINTING SYSTEM

(71) Applicant: Aerones, Inc., San Jose, CA (US)

(72) Inventor: Janis Putrams, Riga (LV)

(73) Assignee: Aerones Engineering, SIA, Riga (LV)

(*) Notice: Subject to any disclaimer, the term of this patent is extended or adjusted under 35 U.S.C. 154(b) by 274 days.

(21) Appl. No.: 18/726,625

(22) PCT Filed: Jan. 14, 2022

(86) PCT No.: PCT/IB2022/050296
§ 371 (c)(1),
(2) Date: Jul. 3, 2024

(87) PCT Pub. No.: WO2023/135448
PCT Pub. Date: Jul. 20, 2023

(65) Prior Publication Data

US 2025/0073758 A1 Mar. 6, 2025

(51) Int. Cl.
*B08B 1/40* (2024.01)
*A46B 11/00* (2006.01)
(Continued)

(52) U.S. Cl.
CPC ............ *B08B 1/40* (2024.01); *A46B 11/0093* (2013.01); *A46B 13/008* (2013.01); *A46B 13/04* (2013.01);
(Continued)

(58) Field of Classification Search
CPC .... B08B 3/02; B08B 3/04; B08B 1/40; B08B 1/36; B08B 1/12; F03D 80/55; F03D 80/502
See application file for complete search history.

(56) References Cited

U.S. PATENT DOCUMENTS

| | | | |
|---|---|---|---|
| 11,020,772 | B2 | 6/2021 | Crunk |
| 2018/0290633 | A1 | 10/2018 | Butz |

FOREIGN PATENT DOCUMENTS

| | | | |
|---|---|---|---|
| EP | 2857109 | A1 | 4/2015 |
| EP | 2752621 | B1 | 12/2016 |

(Continued)

OTHER PUBLICATIONS

International Search report for PCT/IB2022/050296, prepared by the European Patent Office, mailing date Sep. 12, 2022, 3 pages.

*Primary Examiner* — Shay Karls
(74) *Attorney, Agent, or Firm* — Brooks Kushman P.C.

(57) ABSTRACT

The invention relates to wind turbine blade and tower maintenance devices, which can be used for semi- or fully-automated maintenance, including cleaning, de-icing, and painting of wind turbine blades and tower. The wind turbine blade maintenance arrangement, comprising a main frame; a roller frame; at least one cleaning and/or painting means supporting frame; a linear movement rail, comprising the longitudinally extending base surface, two longitudinally-extending walls, being perpendicular to the base surface; a joint, providing for at least one degree of freedom; at least two rollers mounted on the roller frame and configured to allow secure pushing of the arrangement of the cleaning robot against an edge of the wind turbine blade, and moving the maintenance arrangement along the edge of the blade; the cleaning and/or painting means, mounted on the cleaning and/or painting means supporting frame; the cleaning and/or painting means supporting frame or frames are adjustably connected to the roller frame so as to allow controllable adjustment of the distance between the cleaning and/or painting means, and the surfaces of the wind turbine; wherein the main frame and the roller frame are adjustably connected together via a linear movement rail and a joint; the linear movement rail is designed to allow movement of
(Continued)

the roller frame in a substantially horizontal direction in respect to the main frame; the joint is designed to allow controllable rotational movement of the roller frame in respect to the linear movement rail, wherein the rotational axis of the revolute joint is substantially perpendicular to the base surface of the linear movement rail.

11 Claims, 5 Drawing Sheets

(51) Int. Cl.

| | |
|---|---|
| ***A46B 13/00*** | (2006.01) |
| ***A46B 13/04*** | (2006.01) |
| ***B05B 13/00*** | (2006.01) |
| ***B05C 1/02*** | (2006.01) |
| ***B08B 1/12*** | (2024.01) |
| ***B08B 1/36*** | (2024.01) |
| ***B08B 3/02*** | (2006.01) |
| ***F03D 80/50*** | (2016.01) |
| ***F03D 80/55*** | (2016.01) |

(52) U.S. Cl.

CPC ............ *B05B 13/005* (2013.01); *B05C 1/022* (2013.01); *B08B 1/12* (2024.01); *B08B 1/36* (2024.01); *B08B 3/024* (2013.01); *F03D 80/502* (2023.08); *F03D 80/55* (2016.05); *A46B 2200/3073* (2013.01); *B08B 2203/02* (2013.01); *F05B 2230/80* (2013.01); *F05B 2230/90* (2013.01)

(56) References Cited

FOREIGN PATENT DOCUMENTS

| | | | | |
|---|---|---|---|---|
| EP | 3133280 B1 | 3/2018 | | |
| WO | WO-2021121523 A1 * | 6/2021 | ............. | F03D 80/50 |

* cited by examiner

WIND TURBINE ROBOTIC CLEANING AND PAINTING SYSTEM

CROSS-REFERENCE TO RELATED APPLICATION

This application is the U.S. national phase of PCT Application No. PCT/IB2022/050296 filed on Jan. 14, 2022, the disclosure of which is incorporated in its entirety by reference herein.

TECHNICAL FIELD

The invention relates to wind turbine blade and tower maintenance devices. The invention can be used for semi- or fully-automated servicing, including cleaning, deicing, and painting of wind turbine blades and tower.

PRIOR ART

Wind turbine blades are one of the major wind turbine parts. They have an aerodynamic shape to facilitate turning wind energy into mechanical energy, which is then turned into electrical energy by a generator. As the blades spin, they encounter dust particles, sand, snow, water droplets, etc. All these particles, especially rain, cause mechanical stress to the leading edge (LE) of the blade and cause erosion.

To keep blades in good condition and aerodynamically efficient blades need to be maintained and repaired. This is achieved by cleaning the surface of the blade and restoring the protective layer. If damage is minor then painting is enough to restore it. If damage is more severe then applying filler, sanding and painting are necessary.

There is another challenge with ice forming on wind turbine blades in the winter. If ice has formed on the blades, then the turbine needs to be stopped to avoid disbalance that can cause major damage. Ice forming can be mitigated by the application of ice-phobic coating. The process to do that is to clean the surface of the leading edge first and then apply at least one layer of ice repellent coating.

For land-based wind turbines, maintenance is sometimes performed manually—by industrial climbers. Notably, maintenance workers may access the blades in a wind turbine via ropes. However, this maintenance technique is expensive, time-consuming, seasonal, and potentially dangerous.

Consequently, for land-based wind turbines, maintenance equipment is sometimes deployed from the ground to perform semi-automated maintenance. For example, maintenance equipment may be positioned over a wind-turbine blade from the ground using a winch and pulley system.

There is known an exterior cleaning machine in wind turbine towers (EP3133280B1), which is coupled to lifting means in a parallel direction in relation to the outer surface of a tower of a wind turbine. Said machine comprises at least one flexible roller configured to come in contact with part of the surface of a tower of a wind turbine, a plurality of magnets facing part of the outer surface of the tower and configured to attract the machine with regard to the tower; at least one tank configured to receive a cleaning product; a plurality of rolling means located between the structure and the tower; and remote control means of the lifting motion of said machine associated with lifting means. However, the system requires additional painting equipment to paint the tower. The machine has relatively slow tower washing speed due to technological limitation, and washing of the blade is not possible. Moreover, the size and weight of the system makes it difficult to transport and set up the cleaning machine for work.

There is also known a method for cleaning a wind turbine blade with a wind cinch device (U.S. Pat. No. 11,020,772B2), the method comprising: applying a cleaning solution to a surface of a wind turbine blade; affixing a wind cinch device around a high point of the wind turbine blade, the wind cinch including a cleaning surface composed of a soft cloth material and forming a loop that is wrapped around the wind turbine blade; applying tension to one or more lines attached to the wind cinch device to assert pressure on the wind cinch device around the loop of the cleaning surface to maintain the loop of cleaning surface in sufficient contact with the surface of the wind turbine blade to remove the cleaning solution; and applying tension to the one or more lines attached to the wind cinch device to pull the wind cinch device from the high point on the wind turbine blade to a low point on the wind turbine blade. The main disadvantage of the known device is that rope technicians are necessary to operate it. This is connected with high safety risks and other limitations of operation of the device: slower wind speeds are necessary to be able to operate the system; dangerous job for elevated and ground technicians, as they need to be near or underneath the wind cinch while operating; physically demanding task as the device must be guided with ropes. Finally, the known device does not allow to completely clean the blade due to geometrically complicated blade shape and limitations of the device.

There is known a robotic machine for painting wind turbine towers (EP2857109A), comprising a booth having a configuration and dimensions suitable for receiving therein the tower to be painted and includes an inner longitudinal structure along which the paint gun of a robot moves; the exterior of the booth is provided with tanks for paint, impulse pumps and pressure pumps, which convey the paint to the gun; the interior of the booth comprises a rotary supporting system which supports the tower and rotates same and which, by controlling a user interface with specific software, synchronises with the movement of the paint gun along the longitudinal structure. The main drawback of the known robotic machine is that additional cleaning equipment is needed to prepare the turbine surface for painting. Moreover, tower painting is needed to be carried out for a disassembled tower-service cannot be done on the field, which is connected with considerable downtime of the wind turbine.

DETAILED DESCRIPTION OF THE INVENTION

The claimed wind turbine blade maintenance arrangement, comprising a main frame; a roller frame; at least one cleaning and/or painting means supporting frame; a linear movement rail, comprising the longitudinally extending base surface, two longitudinally-extending walls, being perpendicular to the base surface; a joint, providing for at least one degree of freedom; at least two rollers mounted on the roller frame and configured to allow secure pushing of the arrangement of the cleaning robot against an edge of the wind turbine blade, and moving the maintenance arrangement along the edge of the blade; the cleaning and/or painting means, mounted on the cleaning and/or painting means supporting frame; the cleaning and/or painting means supporting frame or frames are adjustably connected to the roller frame so as to allow controllable adjustment of the distance between the cleaning and/or painting means, and the surfaces of the wind turbine; wherein the main frame and the roller frame are adjustably connected together via a linear movement rail and a joint; the linear movement rail is designed to allow movement of the roller frame in a substantially horizontal direction in respect to the main frame; the joint is designed to allow controllable rotational movement of the roller frame in respect to the linear movement rail, wherein the rotational axis of the revolute joint is substantially perpendicular to the base surface of the linear movement rail.

According to the preferred embodiment, the roller frame comprises at least two pairs of two rollers, each pair placed at a distance from each other.

The maintenance arrangement may further comprise one or more actuators, configured to control displacement of the roller frame in respect to the main frame, as well as displacement of the cleaning and/or painting means supporting frame in respect to the wind turbine blade surfaces.

The cleaning and/or painting means may comprise spraying nozzles, hydraulically connected with at least one reservoir for liquid. The cleaning and/or painting means may further comprise brushes, which may be rotating brushes, provided with brush motors, adapted to rotate the brushes. According to the preferred embodiment, the brushes and the spraying nozzles are mounted so to allow for a controllable cleaning edge and both sides of the wind turbine blade.

The brushes and the spraying nozzles may be mounted on the same, or separate cleaning and/or painting means supporting frames.

According to yet another embodiment, the cleaning and/or painting means further comprise one or more windshields, configured to protect the spraying nozzles and spray flow from the wind and the wind gusts.

The cleaning and/or painting means may further comprise excess liquid collection containers, mounted substantially below the spraying nozzles; wherein the blade maintenance arrangement may be further provided with the excess liquid guiding means designed on at least one surface of the windshields and configured for directing the excess liquid to the liquid collection containers.

Figure 1:
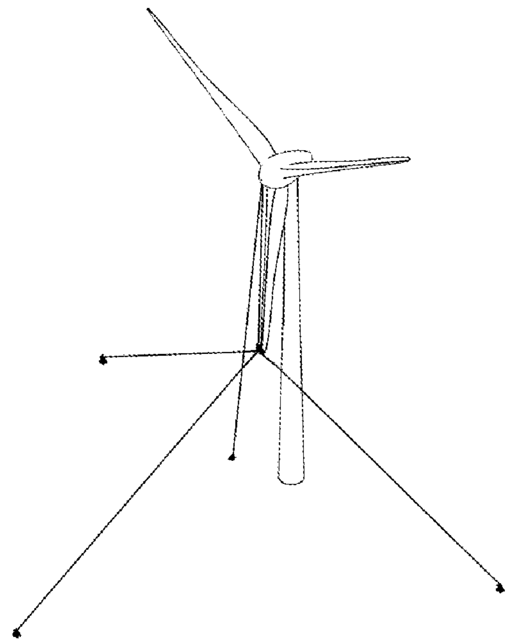
FIG. 1 shows a general view of the wind turbine blade maintenance arrangement positioning over a wind-turbine blade.

The claimed wind turbine blade maintenance arrangement may be positioned over a wind-turbine blade from the ground using a winch and pulley system. Moreover, in order to properly stabilize the maintenance equipment, it is usually secured by up to four anchor points on the ground around a base of a wind-turbine tower (FIG. 1).

DETAILED DESCRIPTION OF THE INVENTION

According to one embodiment, the wind turbine blade maintenance arrangement (FIG. 2) comprises: a main frame 1; a roller frame 2; and at least one cleaning and/or painting means supporting frame 3. The main frame 1 can be the arrangement, as set forth in the international patent application No.: PCT/IB2019/056393.

Figure 3:
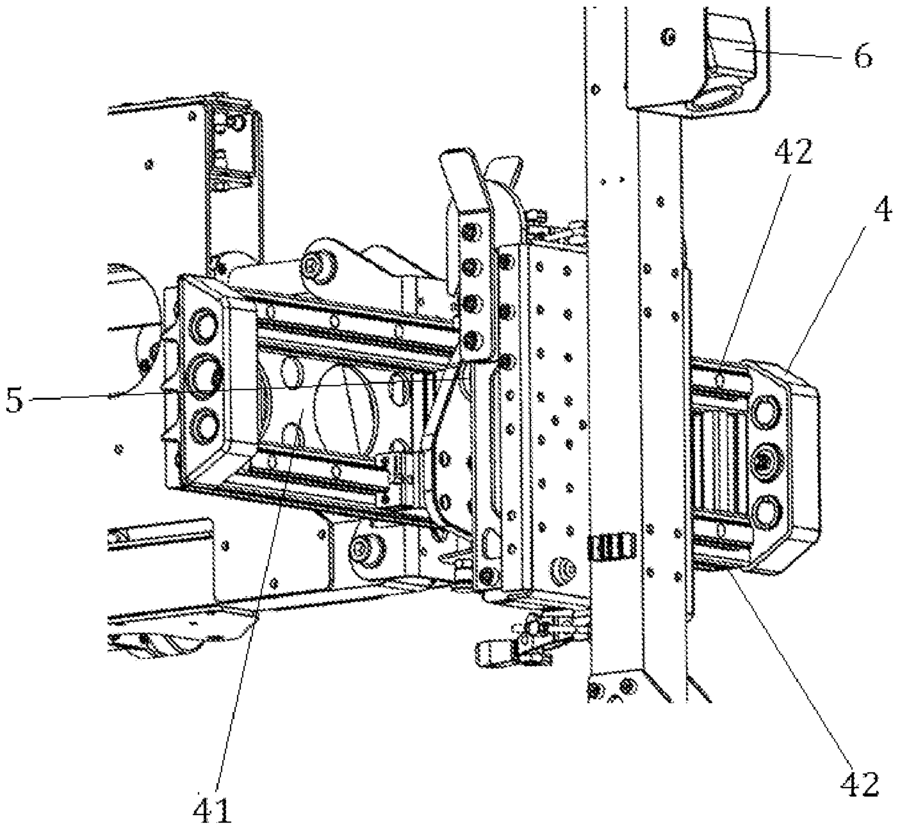
FIG. 3—general view of the linear movement rail.

The main frame 1 and the roller frame 2 are connected via a linear movement rail 4 and a joint 5, providing for at least one degree of freedom, e.g. a revolute joint 5. The linear movement rail 4 is designed to allow movement of the roller frame 2 in substantially horizontal direction in respect to the main frame 1. The joint 5 is designed to allow controllable rotational movement of the roller frame 2 in respect to the linear movement rail 4, wherein the rotational axis of the revolute joint 5 is substantially perpendicular to the base surface 41 of the linear movement rail 4 (FIG. 3). The joint 5 is thus configured to allow the roller frame 2 to follow the profile of the wind turbine blade edge (e.g. leading edge), controllably rotating the roller frame 2 in respect to the main frame 1 as required to follow the profile of the wind turbine blade edge.

The linear movement rail 4 comprising the longitudinally extending base surface 41 and two longitudinally-extending walls 42, being perpendicular to the base surface 41 (FIG. 3). The linear movement rail 4 is thus designed to compensate wind turbine blade swinging from side to side during operation of the claimed robot and to allow substantially horizontal displacement of the roller frame 2 in respect to the main frame 1.

Figure 4:
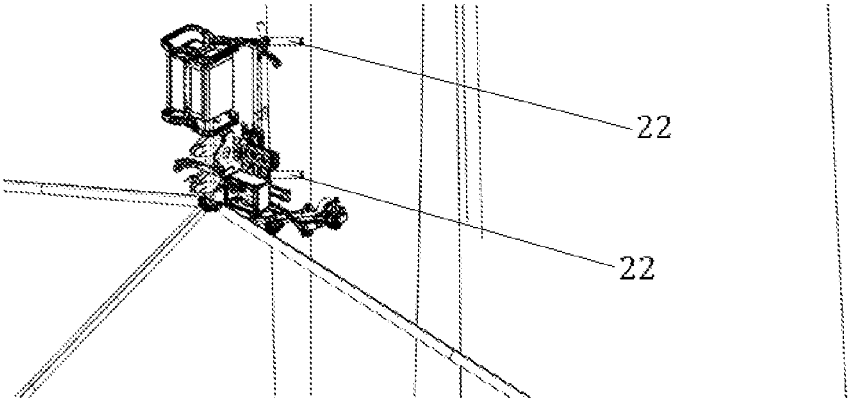
FIG. 4—the wind turbine blade maintenance arrangement, configured for cleaning, positioned for operation over a wind-turbine blade.
Figure 5:
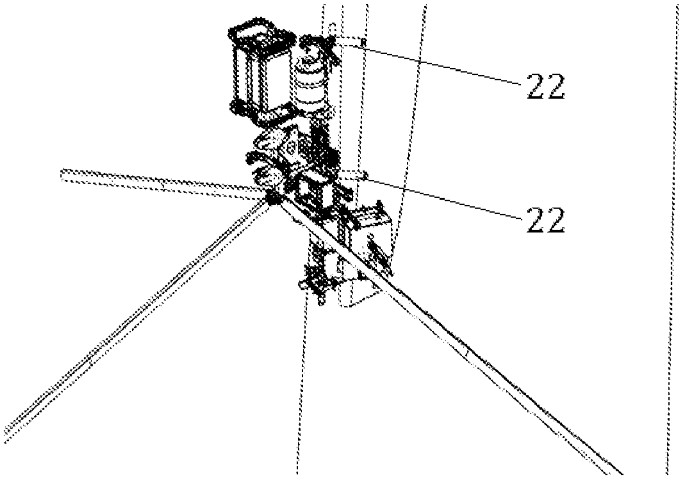
FIG. 5—the wind turbine blade maintenance arrangement, configured for painting, positioned for operation over a wind-turbine blade.

The roller frame 2 can comprise at least two rollers 22 configured to allow secure pushing of the arrangement of the cleaning robot against the leading edge of the blade. The roller frame 2 can comprise more than two rollers 22, for instance-two or three pairs of two rollers 22, each pair placed at a distance from each other and configured to allow secure gentle pushing of the arrangement of the cleaning robot against the leading edge of the blade and moving the cleaning robot along the edge of the blade, keeping cleaning and/or painting means 20 at a distance from the surfaces of the wind turbine blade (FIG. 4-5).

The cleaning and/or painting means supporting frame or frames 3 are adjustably connected to the roller frame 2 so as to allow controllable adjustment of the distance between the cleaning and/or painting means 20, installed thereon and the surfaces of the wind turbine blade being cleaned (i.e. both sides of the wind turbine blade). The cleaning and/or painting means 20 comprise brushes 21 and spraying nozzles 28 (FIG. 2), hydraulically connected with at least one reservoir 23 for liquid.

Figure 2:
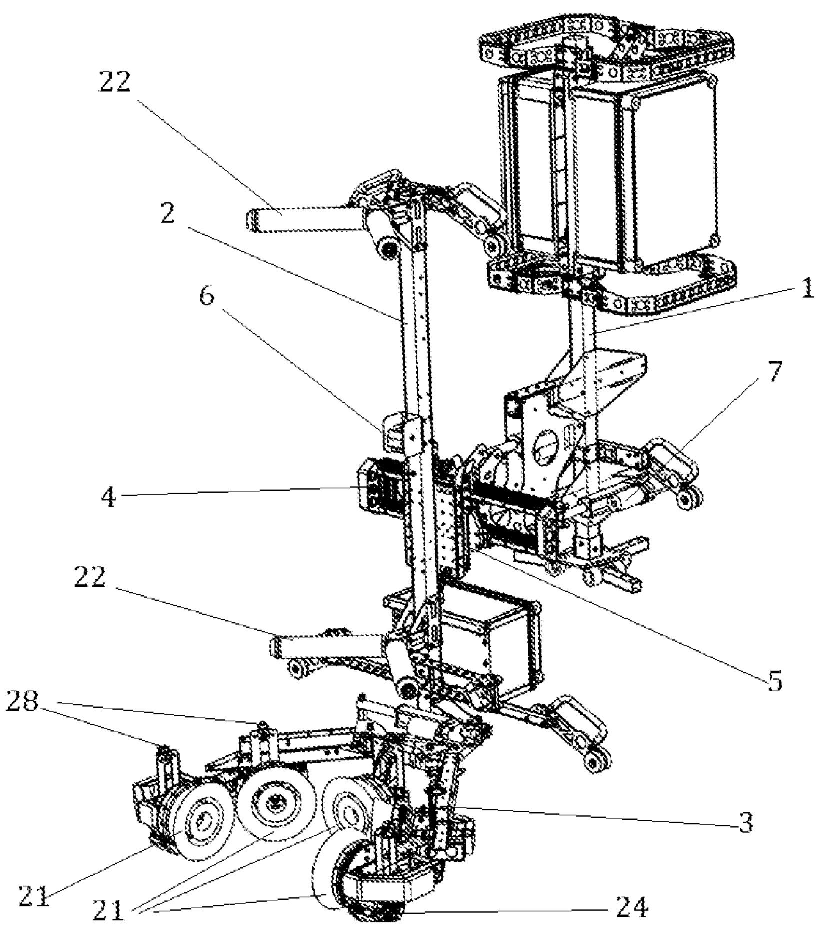
FIG. 2—general view of the cleaning embodiment of the claimed arrangement.

The brushes 21 are preferably rotating brushes, provided with brush motors 24, adapted to rotate the brushes 21 (FIG. 2).

The device may further comprise actuators 7, configured to convert a control signal into mechanical motion and thereby control displacement of the roller frame 2 in respect to the main frame 1, as well as displacement of the cleaning and/or painting means supporting frame 3 in respect to the wind turbine blade surfaces.

The reservoir or reservoirs 23 for liquid can be mounted on the main frame 1, or roller frame 2, or cleaning and/or painting means supporting frame 3.

The brushes 21 and the spraying nozzles 28 are mounted to allow for controllable cleaning at least both sides of the wind turbine blade. According to the preferred embodiments the brushes 21 and the spraying nozzles 28 are mounted to allow for controllable cleaning edge and both sides of the wind turbine blade. The brushes 21 and the spraying nozzles 28 can be either mounted on the same, or separate cleaning and/or painting means supporting frames 3.

The wind turbine blade maintenance arrangement further comprises one or more streaming cameras 6, mounted so as to allow video streaming showing the position of the robot in respect to the wind turbine blade as well as showing the surface of the wind turbine blade to be cleaned (optionally, also the cleaned surface for quality assurance purposes). The streaming cameras 6 can be mounted on the main frame 1, the roller frame 2, the movement rail 4, and/or the cleaning and/or painting means supporting frame 3.

The wind turbine blade maintenance arrangement further comprises one or more windshields 25 (FIG. 6-7), configured to protect the spraying nozzles 28 and spray flow from the wind and the wind gusts, which might occur while painting the blade. The windshields 25 help to keep the spray pattern even. The windshields 25 may be designed to envelop the spraying nozzles 28 from two, three, four, or five sides (from the sides and the back-a box-like configuration), leaving open the side, towards which the spraying nozzle 22 is directed, in order to allow the liquid sprayed to reach the surface of a wind turbine blade. According to the preferred embodiment the windshields 25, which are located on the sides and above the spraying nozzles 28 are configured to get into a slidable sealing contact with the surface of the wind turbine blade, so to prevent any wind gust to blow inside the internal cavity of the windshield, which could alter painting quality, while still allowing to move the arrangement along the surface of the wind turbine blade.

Figure 6:
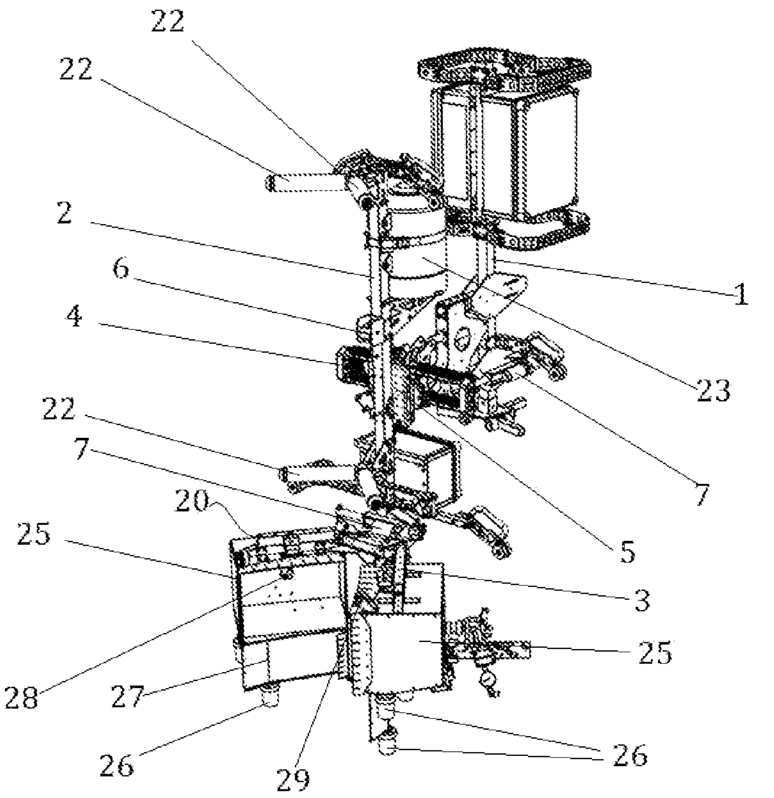
FIG. 6—general view of the painting embodiment of the claimed arrangement.
Figure 7:
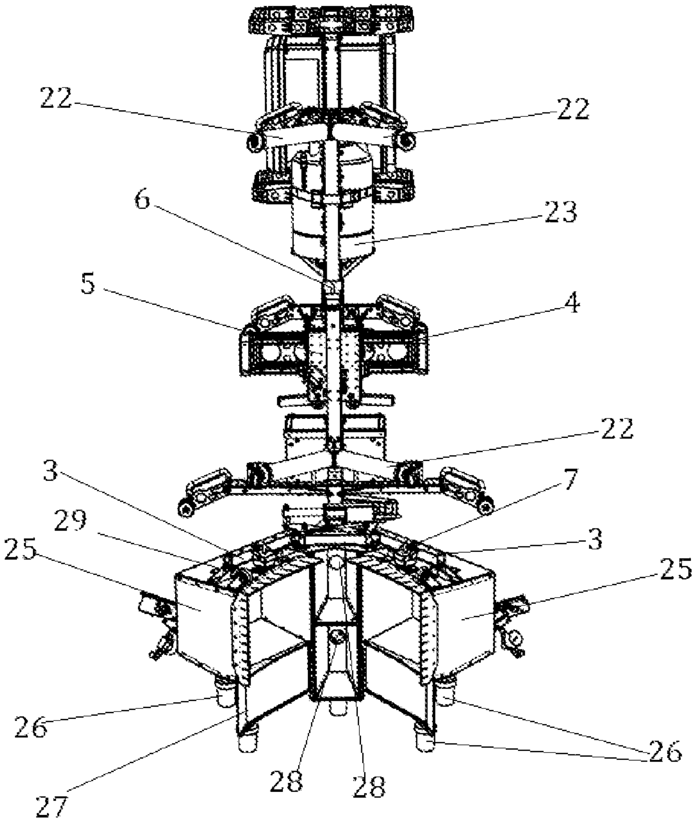
FIG. 7—frontal view of the painting embodiment of the claimed arrangement.

According to yet another embodiment the windshield 25 is further provided with at least one wheel, or a slider roller 29 on peripheral parts of the cleaning and/or painting means supporting frame 3, or lateral sides of the windshield 25 setting (i.e. on peripheral parts of the arrangement, e.g. above and at a distance from the spraying nozzle 22, as shown in FIGS. 6 and 7). While painting, the wheels or rollers 29 slide, or roll along the blade and according to blade geometry change the position of the cleaning and/or painting means supporting frames 3 and thus,—cleaning and/or painting means 20, ensuring that the spraying nozzles 22 are at a constant distance from the blade despite the geometry of the blade.

The cleaning and/or painting means 20 may further comprise one or more excess liquid collection containers 26, mounted substantially below the windshields 25. The blade maintenance arrangement is further provided with excess liquid guiding means 27 for guiding the excess liquid from the spraying nozzles 28 to the liquid collection containers 26. The excess liquid guiding means 27 may be in the form of grooves or inclines on at least one surface of the windshields 25 configured to direct the liquid to the liquid collection containers 26. Thus, the main function of the liquid collection containers 26 is to collect excess paint or liquid from the robot that gets sprayed on the walls. Excess paint or liquid is guided to the collection containers 26 by channels that are geometrically created on the or in the windshields 25. With the help of gravity, the excess liquid flows into a container 26, preferably located under the lowest point of a respective windshield 25.

The claimed maintenance arrangement can be placed in servicing position towards a blade or a tower of a wind turbine, e.g. using the arrangement and the system for lowering and raising of the robot, as set forth in international patent application No.: PCT/IB2019/056393, or similar arrangement.

The cleaning embodiment of the wind turbine blade maintenance arrangement can be brought up to the blade with a winch positioning system. When at the blade tip, it is positioned and slightly pushed against the leading edge of the blade with the rollers 22. Actuators 7 adjust cleaning and/or painting means supporting frame 3 to set the required distance between the brushes 21 and the surface of the wind turbine blade. Then the maintenance arrangement is moved as required, e.g. up and down along the leading edge, while cleaning the wind turbine blade surface. The actuators 7 placed on the maintenance arrangement are configured to follow the leading edge as precisely as possible, by changing the jaw and pitch of the maintenance arrangement. To compensate for blade movement in the wind, the roller frame 2 and the main frame 1 are connected via the horizontal (linear) movement rail 4, which allows for linear displacement of the roller frame 2 in respect to the main frame 1 and thus, help the cleaning and/or painting means supporting frame 3 to move with the blade. This makes it easier for the operator to control and position the cleaning and/or painting means supporting frame 3.

The painting embodiment of the wind turbine blade maintenance arrangement is similarly brought up to the blade with a winch positioning system. When at the blade tip, it is positioned and slightly pushed against the leading edge of the blade with the rollers 22. The actuators 7 move the cleaning and/or painting means supporting frames 3 and thus, also cleaning and/or painting means 20 into operational position. The wind turbine blade maintenance arrangement is moved up with a predetermined speed and the desired coating is applied with spraying nozzles 28. Paint or other liquid supply (e.g. de-icing solution) can be provided either from a single liquid pressure tank or individual containers 26 for each of the spraying nozzles 28. The cleaning and/or painting means supporting frames 3 position is regulated with the wheels or rollers attached to the windshields, which roll on the blade, and springs, which keep the cleaning and/or painting means supporting frames 3 in operational position.

There are several actuators 7 placed on the wind turbine blade maintenance arrangement in order to follow the leading edge as precisely as possible, by changing the jaw and pitch of the roller frame 2. To compensate for blade movement in the wind, the roller frame 2 and the main frame 1 are connected via the horizontal (linear) movement rail 4, which allows for linear displacement of the roller frame 2 in respect to the main frame 1 and thus, help the cleaning and/or painting means supporting frame 3 to move with the blade. This makes it easier for the operator to control and position the cleaning and/or painting means supporting frame 3.

The invention claimed is:

1. A wind turbine blade maintenance arrangement, comprising a main frame; a roller frame; a cleaning and/or painting means supporting frame; a linear movement rail, comprising a longitudinally extending base surface, two longitudinally-extending walls, being perpendicular to the base surface; at least two rollers mounted on the roller frame and configured to allow secure pushing of the arrangement of the cleaning robot against an edge of the wind turbine blade, and moving the maintenance arrangement along the edge of the wind turbine blade; a cleaning and/or painting means, mounted on the cleaning and/or painting means supporting frame; the cleaning and/or painting means supporting frame is adjustably connected to the roller frame so as to allow controllable adjustment of the distance between the cleaning and/or painting means, and the surfaces of the wind turbine; wherein the main frame and the roller frame are adjustably connected together via a linear movement rail and a joint;

the linear movement rail is designed to allow movement of the roller frame in a substantially horizontal direction in respect to the main frame;

the joint is designed to allow controllable rotational movement of the roller frame in respect to the linear movement rail, wherein the rotational axis of the joint is substantially perpendicular to the base surface of the linear movement rail.

2. The wind turbine blade maintenance arrangement, according to claim 1, wherein the roller frame comprises at least two pairs of two rollers, each pair placed at a distance from each other.

3. The wind turbine blade maintenance arrangement, according to claim 1, wherein the maintenance arrangement further comprises one or more actuators, configured to control displacement of the roller frame in respect to the main frame, as well as displacement of the cleaning and/or painting means supporting frame in respect to the wind turbine blade surfaces.

4. The wind turbine blade maintenance arrangement, according to claim 1, wherein the cleaning and/or painting means comprise spraying nozzles, hydraulically connected with at least one reservoir for liquid.

5. The wind turbine blade maintenance arrangement, according to claim 4, wherein the cleaning and/or painting means further comprise brushes.

6. The wind turbine blade maintenance arrangement, according to claim 5, wherein the brushes are rotating brushes, provided with brush motors, adapted to rotate the brushes.

7. The wind turbine blade maintenance arrangement, according to claim 5, wherein the brushes and the spraying nozzles are mounted so to allow for controllable cleaning edge and both sides of the wind turbine blade.

8. The wind turbine blade maintenance arrangement, according to claim 5, wherein the brushes and the spraying nozzles are mounted on the same, or separate cleaning and/or painting means supporting frames.

9. The wind turbine blade maintenance arrangement, according to claim 4, wherein the cleaning and/or painting means further comprise one or more windshields, configured to protect the spraying nozzles and spray flow from the wind and the wind gusts.

10. The wind turbine blade maintenance arrangement, according to claim 9, wherein the windshields, are located on the sides and above the spraying nozzles and are configured to get into a slidable sealing contact with the surface of the wind turbine blade.

11. The wind turbine blade maintenance arrangement, according to claim 9, wherein the cleaning and/or painting means further comprise excess liquid collection containers, mounted substantially below the spraying nozzles; wherein the blade maintenance arrangement is further provided with the excess liquid guiding means on at least one surface of the windshields, adapted for directing the excess liquid to the excess liquid collection containers.

* * * * *